(12) United States Patent
Oberle et al.

(10) Patent No.: US 9,463,726 B2
(45) Date of Patent: Oct. 11, 2016

(54) SEAT COVER ATTACHING DEVICE

(75) Inventors: Jean-Marc Oberle, Eckbolsheim (FR); Louis Viegas, Wasselonne (FR); Thierry Marechal, Oberhausbergen (FR)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 14/409,877

(22) PCT Filed: Jun. 19, 2012

(86) PCT No.: PCT/FR2012/051369
§ 371 (c)(1),
(2), (4) Date: Feb. 27, 2015

(87) PCT Pub. No.: WO2013/190186
PCT Pub. Date: Dec. 27, 2013

(65) Prior Publication Data
US 2015/0183349 A1     Jul. 2, 2015

(51) Int. Cl.
| A47C 7/02 | (2006.01) |
| B60N 2/58 | (2006.01) |
| A47C 7/24 | (2006.01) |
| B60N 2/66 | (2006.01) |
| B60N 2/60 | (2006.01) |

(52) U.S. Cl.
CPC .............. *B60N 2/5825* (2013.01); *A47C 7/24* (2013.01); *B60N 2/6027* (2013.01); *B60N 2/66* (2013.01); *B60N 2/5816* (2013.01); *B60N 2/6018* (2013.01); *Y10T 24/309* (2015.01); *Y10T 24/44017* (2015.01)

(58) Field of Classification Search
CPC  B60N 2/5825; B60N 2/6027; B60N 2/6018; B60N 2/5816
USPC .............. 297/452.32, 452.48, 218.2, 452.6, 297/452.26, 218.1, 218.4
See application file for complete search history.

(56) References Cited

U.S. PATENT DOCUMENTS

| 3,771,199 A | 11/1973 | Eldringhoff |
| 5,214,811 A | 6/1993 | Priem |
| 6,899,399 B2 * | 5/2005 | Ali ........................ B60N 2/5825 |
| | | 297/452.6 |

(Continued)

FOREIGN PATENT DOCUMENTS

| FR | 2486922 | 1/1982 |
| GB | 2025558 A | 1/1980 |

(Continued)

OTHER PUBLICATIONS

International Search Report, PCT/FR2012/051369, Feb. 27, 2015, 6 pages.

*Primary Examiner* — Chi Q Nguyen
(74) *Attorney, Agent, or Firm* — Price Heneveld LLP (57) ABSTRACT

A device for fixing/firmly holding an exterior covering against a seat backrest includes a backrest structure having a peripheral surround and a connector; padding covering the structure of the backrest; a covering attached to the peripheral surround of the structure of the backrest and covering the padding; an intermediate member of fastening stake type provided with an external head pressing against the covering and with a shank secured to said head and extending through the padding. A free end of the shank includes an end fitting which fixes into the connector in such a way that the member under-goes some excursion in the connector when pressure is applied to the covering and to the padding.

10 Claims, 5 Drawing Sheets

(56) References Cited

U.S. PATENT DOCUMENTS

| | | | | |
|---|---|---|---|---|
| 6,964,453 B1* | 11/2005 | Flegal | ............... | B60N 2/5825 297/452.6 |
| 7,517,577 B2* | 4/2009 | Pedde | ............... | B29C 33/12 24/302 |
| 7,559,100 B2* | 7/2009 | Pedde | ............... | B60N 2/5825 24/584.1 |
| 8,191,971 B2* | 6/2012 | Lovasz | ............... | B60N 2/5825 297/452.59 |
| 8,197,010 B2* | 6/2012 | Galbreath | ............... | B60N 2/5825 297/218.2 |
| 2002/0074845 A1* | 6/2002 | Perske | ............... | B60N 2/5825 297/452.6 |
| 2002/0101109 A1* | 8/2002 | Stiller | ............... | B60N 2/5825 297/452.6 |
| 2003/0215601 A1* | 11/2003 | Pedde | ............... | B29C 33/12 428/102 |
| 2008/0224509 A1 | 9/2008 | Demick | | |

FOREIGN PATENT DOCUMENTS

| | | |
|---|---|---|
| JP | 2011156252 A | 8/2011 |
| WO | 2011024675 A1 | 3/2011 |

\* cited by examiner

SEAT COVER ATTACHING DEVICE

BACKGROUND OF THE INVENTION

The invention pertains to a device for attaching/firmly holding an exterior covering against an elastic layer type padding with thickness (e) and made of foam attached to the structure of a seat bottom or backrest.

Such a device is meant to press the exterior covering, typically a soft fabric, in such a way that the fabric conforms to the shape of the padding of the backrest or seat and so that there is no area where the exterior covering is taut in relation to the foam when the foam has a concave shape, thus forming an unsightly gap between the taut exterior covering and the foam, because it does not reproduce the actual profile of the backrest.

Until now, this cladding problem has been resolved indirectly by joining different pieces of covering to each other on a same backrest, each piece of covering corresponding to an area of foam having a predefined shape, in such a way that the pieces of covering, once joined to each other, perfectly correspond to the shape given by the foam. In other words, it wasn't a matter of using a single piece of fabric for complex shapes of the backrest. This is especially the case in seat bottoms and backs used in the automotive field. Generally, these pieces of covering are attached by seams and often fastened peripherally by male connectors which can be clipped into female connectors pre-inserted in the foam of the seat or back. The clipping between the male connector and the female connector is thus made inside of the foam, in a hollow region provided for this purpose.

Documents JP 2011156252 and WO 201124675 or US 20080224509 disclose such cladding device, which have the drawback of a fastidious and long implementation given the number of junctions to be made and which are, moreover, not easy because they are made in part blindly within the foam.

The piecing of the exterior covering complicates its attachment to the structure and to the foam and gives an unattractive appearance to the exterior of the seat bottom and backrest. The male connectors and the female connectors are moreover relatively sophisticated components, thus leading to an additional cost to manufacture the seat.

There are also cladding devices made from upholstery buttons. These buttons are also used for the decoration of couches or armchairs. They are composed of a relatively thick head which is visible from the exterior since they are decorative elements, and a shank with a pointed end fitting, so that the button can be stuck into the padded lining of the armchair. A clip is provided so that the buttons cannot be withdrawn from the armchair. Again, it is therefore necessary to have both a male part (the button) and a female part (the clip) in order to be able to firmly hold the covering against the padding of the seat. The documents U.S. Pat. No. 5,214,811, GB 2025558 and U.S. Pat. No. 3,771,199 disclose such upholstery buttons.

These upholstery buttons have the drawback of having a relatively thick and imposing head which can therefore be bothersome to the user's back when he/she leans into the backrest of a seat for example. Moreover, these buttons do not allow the covering to conform to the shape of the padded lining because they heavily compress it when they are clipped. They create compression zones in the armchair, intended to be decorative.

SUMMARY OF THE INVENTION

Thus, the purpose of the invention is to propose a device for fixing/firmly holding an exterior covering against a foam layer attached to the structure of a seat bottom or backrest which is simple to implement, which allows a single-piece covering to conform to the shape of the foam, and which is not bothersome when the user sits on the seat or leans back in the seat, regardless of the state of compression of the foam.

To this end, this invention pertains to a fastening/holding device comprising:

a backrest structure featuring a peripheral surround and a connector;

padding covering the structure of the backrest;

a covering attached to the peripheral surround of the structure of the backrest and covering the padding;

an intermediate member of fastening stake type provided with an exterior head pressing against the covering and with a shank secured to said head and extending through the padding, with the free end of the shank consisting of an end fitting which fastens into the connector in such a way that the member undergoes some excursion in the connector when pressure is applied to the covering and to the padding.

The latter consists of an elastic layer of thickness e comprised of foam fastened to the structure of the backrest.

The end fitting is elastically clippable in the connector consisting of an opening in a wall of the structure, the length/between the head of the stake and the end fitting being specified such that the head presses the covering against the foam, with the mechanical link between the stake and the structure allowing an axial excursion d of the stake of a range less than e. This stake thus has the advantage of having a head with a flat profile which is therefore not perceptible to the back of the user when he/she leans against the backrest of the seat.

Additionally, the stake is clippable directly into the wall of the structure of the backrest. Indeed, the connector is directly integrated into the structure of the backrest, and consists of a wall of the structure in which an opening is made. It is therefore not necessary to make a specific male part which is independent of the chair's structure in order to allow the stake to be clipped and the covering to be maintained pressed against the foam. This device is thus greatly simplified compared to the devices known from the prior art. Advantageously, the fastening of the stake in the structure is done instantaneously and without a tool.

Another advantage lies in the fact that the stake can have an axial excursion d and thus adapts itself instantaneously to the compression of the foam. In fact, the foam is more or less compressed according to a person's position on the seat and according to his/her weight also.

For the backrest of the seat for example, when the person is not leaning back in the seat, the foam is not compressed. In this case, the head of the stake presses on the covering against the padding almost without compressing it. When the user leans against the backrest of the seat and compresses the foam, the stake is configured so as to allow it to also penetrate into the interior of the backrest by an axial displacement in such a way that it is not projecting in relation to the backrest of the seat and so that the user does not feel it in his/her back. The stake follows, somewhat, the movement of compression of the foam. As a result, regardless of the state of compression of the foam, the exterior covering is always firmly held against the foam and the user is never aware of the stake.

According to the invention, the axial displacement d of the stake is delimited by two stops, the first stop being activated in the direction of insertion of the shank through the foam layer and the structure so as to limit its insertion In the opening, with the second stop being activated in the direction of the withdrawal of the shank so as to prevent it from exiting the opening. More precisely, each stop consists of a face which blocks the translational movement of the stake, oriented perpendicularly to the direction of insertion of the stake in the opening and situated opposite the wall of the structure in which the opening is made, said displacement-blocking face being capable of coming into contact with said wall of the structure.

In concrete terms, when the foam isn't compressed, the second stop is in contact with the wall of the structure whereas, when the foam is compressed to the maximum, the first stop is in contact with the wall of the structure.

According to one possible configuration, the first stop consists of a shoulder which marks the limit between an intermediate portion of the shank and a thicker portion of the shank joining the head of the pin, and in which the second stop marks the limit between said intermediate portion and the clipping end of the shank.

This thicker area of the shank has the advantage of reinforcing the junction between the shank and the head. The end fitting of the stake with the shoulder ensures, in turn, two functions, namely the function of clipping the stake into the structure and the function of limiting the travel of the stake within the backrest.

In practice, the length of the thicker portion s of the shank is less than or equal to the thickness of the layer of foam when it is compressed. In this way, even when the foam layer is compressed to the maximum, the head of the stake will never protrude from the foam layer. As a result, whatever the state of compression of the foam layer, the thicker area of the shank will always be contained within the thickness of the foam and the head of the stake will remain within the surround without protruding.

To allow this excursion of the stake, a hollow space is provided in the structure downstream from the opening in the direction of insertion of the shank, with the depth of said hollow space corresponding at least to the distance p separating the first stop from the end of the end fitting. In this way, when the first stop is in contact with the wall of the structure, i.e. when the foam is compressed to the maximum, the entire portion of the shank downstream from the first stop is contained in this hollow space and doesn't project beyond the rear limit of the backrest. It is thus entirely hidden within the structure in the interior of the backrest.

Such a hollow space is generally easily produced, because the current structures are molded or thermoformed, so as to present a honeycomb structure, therefore with numerous hollow spaces, connected by reinforcement areas.

According to one possibility, the end fitting of the shank of the stake consists of a post tapering towards its free end and thus facilitating the insertion of the shank in the opening. This post features peripheral fins capable of being deformed elastically toward the axis of the shank when the post is engaged in the opening for the clipping. It is not necessary for the free end of the end fitting to have a pointed shape. A rounded shape is entirely suitable.

The scale of the fins is slightly larger than the opening of the hole. Their insertion is possible just the same due to a slight elastic deformation during the introduction of the end fitting into the opening. The fins thus return to their initial shape after their introduction in the opening, and the withdrawal of the stake is thus no longer possible.

Preferably, the stake consists of two identical parallel shanks capable of being inserted in two openings made in said wall of the structure. The fact of having two shanks allows the surface of the head of the stake to be enlarged and thus to enlarge the surface for holding the covering against the foam layer.

The holding function itself is also more resistant with the aid of two shanks.

Preferably, the foam layer has a general shape which reproduces the curvature of the lumbar portion of the back of a user, said curvature including a concave portion extended by a convex portion which together have a sinusoidal shape, said stake being placed at the junction between the concave portion and the convex portion and being capable of translational movement according to a predetermined axial excursion d in relation to the wall of the structure of the backrest of the seat. In fact, it is at the time of the change of curvature than the exterior covering has a tendency to be stretched and to no longer conform to the shape of the foam layer. The stake must therefore be placed at this favorable location.

DETAILED DESCRIPTION

Figure 1:
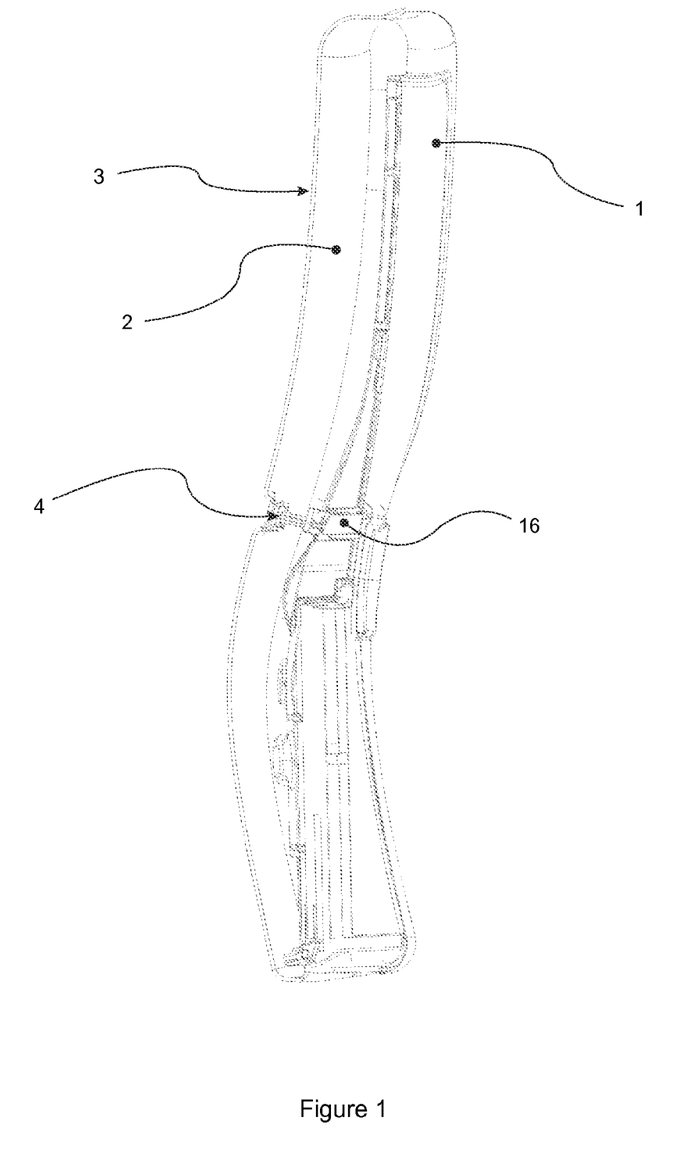
FIG. 1 is a sectional view of a fixing/holding device according to the invention.

With regard to FIG. 1, the seat backrest is composed mainly of three parts:
- a rigid structure (1);
- an elastic foam layer (2) fastened to the structure (1);
- an exterior covering (3), preferably of fabric, which covers the entire foam layer (2), and which defines the aesthetic look of the backrest.

The foam layer (2) substantially reproduces the shape of the lumbar curvature of a person, such that the back of the user rests against the entire surface of the backrest, and not only on a specific area of the backrest. This form of the foam layer (2) thus considerably improves the comfort of the user. This curvature features a concave portion which is extended by a convex portion together having a sinusoidal shape.

The covering (3) is attached to the peripheral surround of the structure (1) of the backrest so as to cover the foam layer (2) and is taut. It does not therefore naturally take on the shape of the curvature of the foam layer (2), and does not therefore conform to the shape of the foam layer in various places.

A device for holding the covering (3) against the foam layer (2) is thus provided for the change in curvature of the backrest. More precisely, a fastening stake (4) presses against the covering (3), passes through the foam (2) and is finally clipped into a wall (5) (see FIGS. 3 to 6) of the structure (1) of the backrest.

Figure 2:
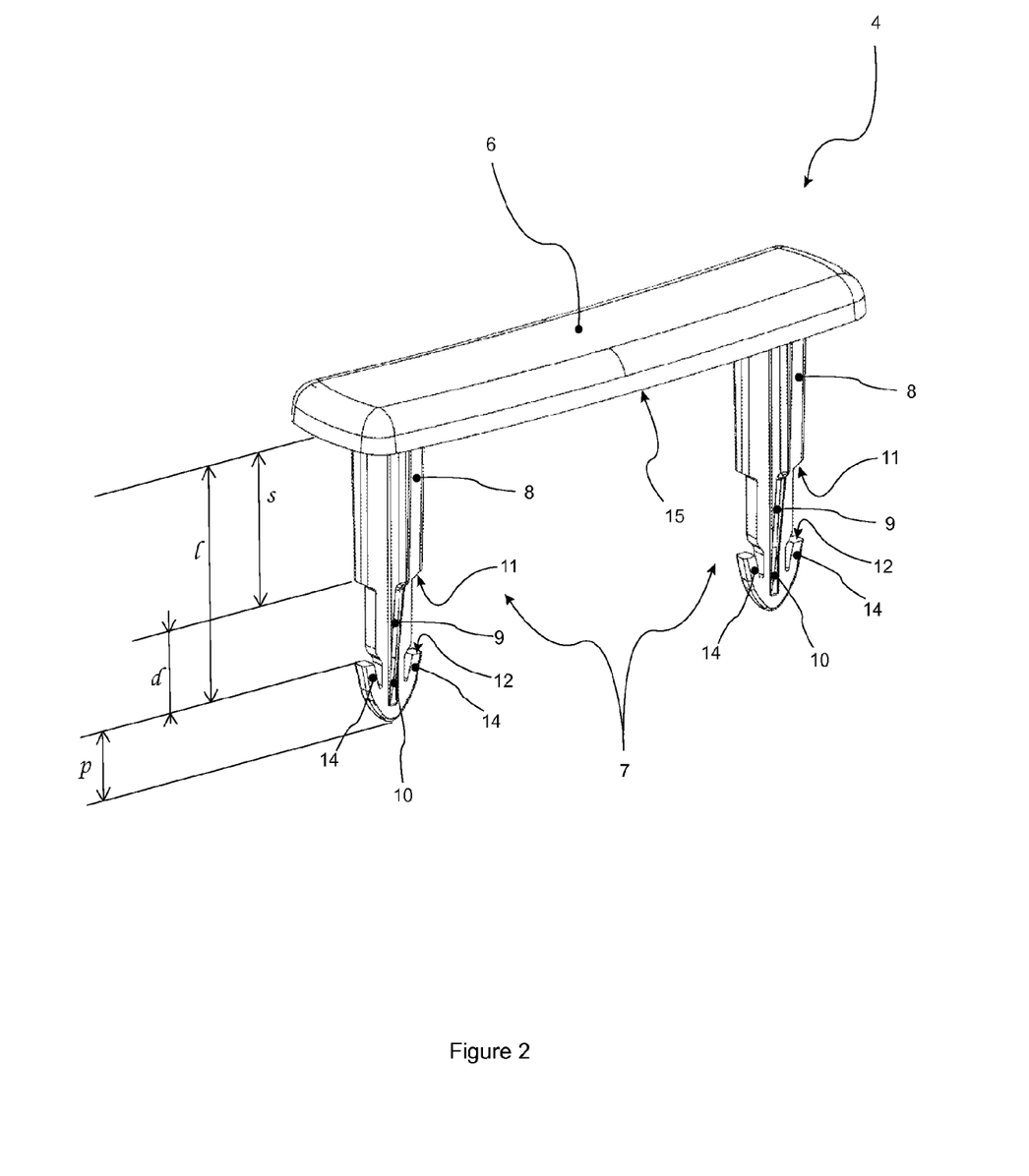
FIG. 2 is an enlarged view of the stake.

FIG. 2 shows this stake (4) in detail. It is provided with a head (6) with flat shape and with two parallel shanks (7) extending substantially orthogonally in relation to the head (6). Each shank (7) is composed of:
- a thicker portion (8) joining the head (6) of the stake (4);
- a thinner intermediate portion (9);

an end fitting (10) at the free end of the shank (7).

The end fitting (10) is provided to be clipped in the wall (5) of the structure (1) of the backrest, like a post. It tapers toward its end, and its sides are formed by two fins (14) constituted so as to be capable of being elastically deformed. The limit between the thicker portion (8) and the thinner intermediate portion (9) is marked by a shoulder which constitutes a first stop (11). The limit between the intermediate portion (9) and the end fitting (10) is marked by the free end of the fins (14) which projects from the intermediate portion (9), and which constitutes a second stop (12).

Figure 3:
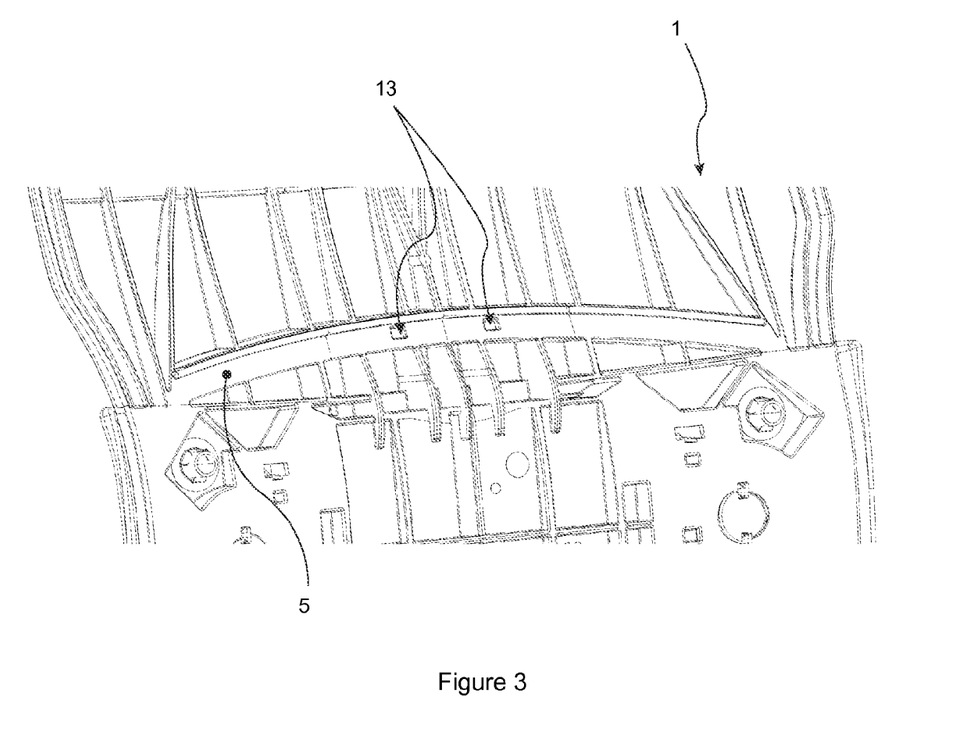
FIG. 3 shows the interior structure of the backrest on which a foam layer rests.

These two shanks (7) are suitable for being inserted in connectors such as two holes or openings (13) made in a wall (5) of the structure (1) of the backrest, as is illustrated in FIG. 3. The size of each opening (13) is slightly smaller than the scale of the fins (14) of the end fitting (10), and its insertion is therefore possible only by elastic deformation of the fins (14) towards the axis of the shank (7) thus allowing the end fitting (10) to be clipped.

Figure 4:
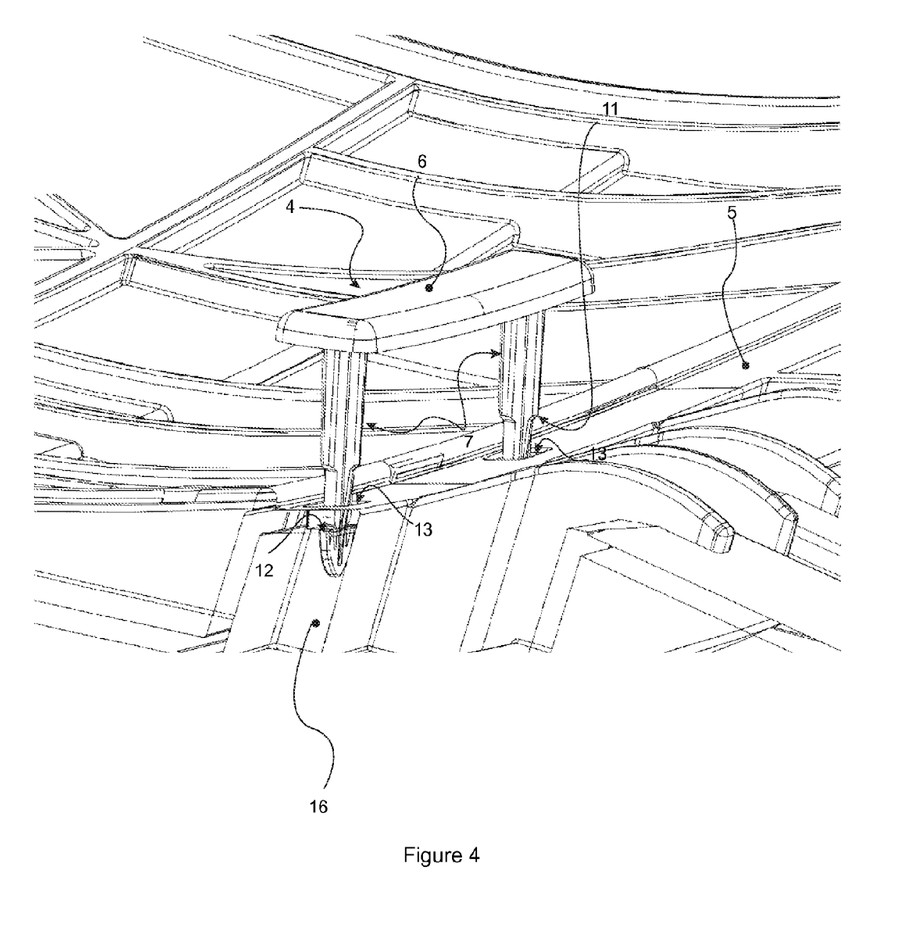
FIG. 4 represents the stake inserted in the structure of the backrest, without the foam layer.
Figure 5:
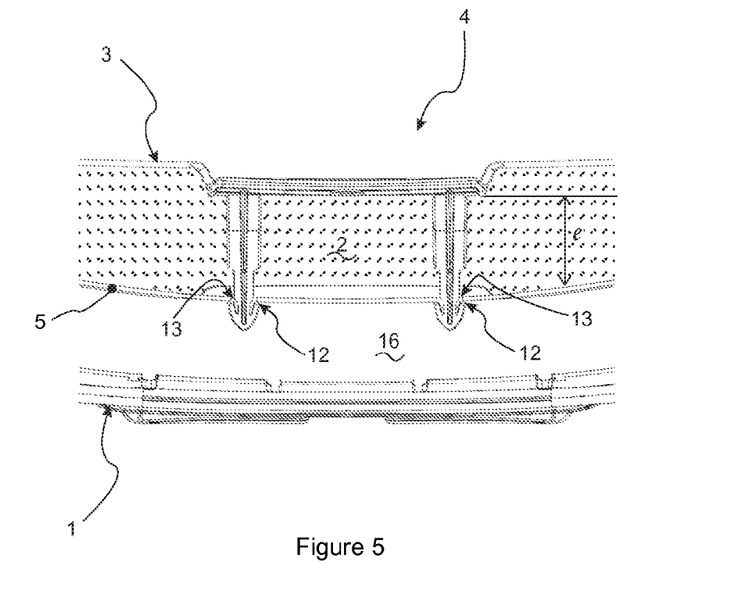
FIG. 5 shows the stake inserted in the structure of the backrest when the foam layer is not compressed.

FIG. 4 illustrates the stake (4) clipped into the two openings (13) of the wall (5) of the structure (1) of the backrest. For more clarity, the foam layer (2) isn't visible. Once the stake (4) is thus clipped, it can freely move according to an axial displacement (d) delimited by the two previously mentioned stops (11, 12). In practical terms, the axial displacement (d) corresponds to the length of the intermediate portions (9) of the shanks (7).

in FIG. 5, the stake (4) is in a first clipped position, with the second stop (12) of each shank (7) in contact with the wall (5) of the structure (1) of the backrest, so as to prevent the stake (4) from exiting the openings. The foam layer (2) is not compressed, and the stake (4) is in a maximally extended position. The distance (I) between the second stop (12) and the head (6) of the stake (4) defines the foam thickness (e) that there can be at maximum with regard to the stake (4). The foam layer (2) being elastic, it has a tendency to exert a force on the interior face (15) of the stake (4) in the direction of the exterior, so as to make it extend to the maximum. When a user leans back, the pressure of his/her back compresses the elastic foam layer (2), and the stake (4) follows this compression in approaching the structure (1) of the backrest.

Figure 6:
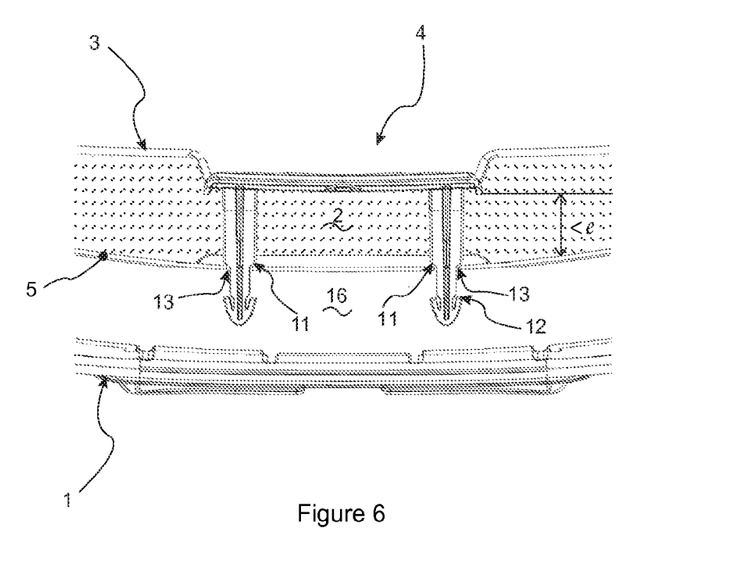
FIG. 6 shows the stake inserted in the structure of the backrest when the foam layer is compressed.

As illustrated in FIG. 6, the shanks (7) of the stake (4) penetrate deeper into the openings (13). This axial excursion of the stake (4) is limited by its first stop (11) which comes into contact with the wall (5) of the structure (1) of the backrest. In this case, the stake (4) is in retracted position, and the foam (2) is compressed. The thickness of the compressed foam layer (2) must not be less than the length(s) of the thicker portion of the shanks (7) (i.e. the distance between the first stop (11) and the head (6) of the stake (4)), in which case the head (6) of the stake (4) would protrude relative to the exterior surface of the foam layer (2), and would not only no longer hold the covering (3) against the foam layer (2), but would also be bothersome to the user's back and would thus cause an unpleasant sensation.

A hollow space (16) is provided within the structure (1) of the backrest, downstream from the openings (13) on the back of the backrest, so as to contain the portion of the shank (7) inserted in the opening (13) when the stake (4) is in retracted position. Thus, the depth of this hollow space (16) must at least correspond to the distance (p) separating the first stop (11) and the end of the end fitting (10) of the shank (7). During normal use of this seat back, the stake (4) somewhat follows the compression movements of the foam layer (2) so as to always hold the covering (3) against the foam layer (2) while remaining imperceptible to the back of the user.

The invention claimed is:

1. A backrest of a seat, comprising:
a backrest structure including a peripheral surround and a connector;
a padding covering at least a portion of the backrest structure;
a covering attached to the peripheral surround of the backrest structure and covering at least a portion of the padding, the covering having an inner surface facing the padding, and an outer surface facing away from the padding;
a fastening stake having an exterior head pressing against the outer surface of the covering and a shank having a free end, wherein the shank is secured to the exterior head and extends through the padding, with the free end of the shank comprising an end fitting which fastens into the connector in such a way that the free end of the shank in the connector undergoes excursion when a pressure is applied to the covering and to the padding.

2. The backrest of claim 1, wherein:
the backrest structure comprises a wall;
the connector comprises an opening in the wall;
the padding comprises an elastic layer of foam defining a thickness, wherein the layer of foam is attached to the backrest structure, with the end fitting being clippable elastically in the opening of the wall to define a mechanical link between the stake and the structure, with the length between the head of the stake and the end fitting being provided so that the head presses the covering against the foam, with the mechanical link between the stake and the structure allowing an axial excursion of the stake of a range that is less than the thickness of the layer of foam.

3. The backrest of claim 1, wherein:
the end fitting comprises a tapered post, the end fitting including peripheral fins capable of being deformed elastically toward an axis of the shank when the post is engaged in the opening.

4. The backrest of claim 1, wherein:
the stake includes two identical parallel shanks suitable for being inserted in two openings made in the wall of the structure.

5. The backrest of claim 1, wherein:
the foam layer has a shape generally corresponding to a curvature of a lumbar portion of a back of a user, the curvature having a concave portion extended by a convex portion together having a sinusoidal shape, wherein the stake is located at a junction between the concave portion and the convex portion and being capable of being displaced translationally along a predetermined axial excursion in relation to the wall of the backrest structure.

6. A backrest of a seat, comprising:
a backrest structure featuring a peripheral surround and a connector;
a padding covering at least a portion of the backrest structure;
a covering attached to the peripheral surround of the backrest structure and covering at least a portion of the padding;
a fastening stake having an exterior head pressing against the covering and a shank secured to the exterior head and extending through the padding, with the free end of the shank comprising an end fitting which fastens into the connector in such a way that the free end of the shank in the connector undergoes excursion when a pressure is applied to the covering and to the padding;

the backrest structure comprises a wall;

the connector comprises an opening in the wall;

the padding comprises an elastic layer of foam defining a thickness, wherein the layer of foam is attached to the backrest structure, with the end fitting being clippable elastically in the opening of the wall to define a mechanical link between the stake and the structure, with the length between the head of the stake and the end fitting being provided so that the head presses the covering against the foam, with the mechanical link between the stake and the structure allowing an axial excursion of the stake of a range that is less than the thickness of the layer of foam; and the axial excursion of the stake is delimited by first and second stops with the first stop being activated in the direction of insertion of the shank through the layer of foam and the backrest structure in such a way as to limit insertion of the shank in the opening, with the second stop being activated in the direction of withdrawal of the shank so as to prevent the shank from exiting the opening.

7. The backrest of claim 6, wherein:

each stop comprises a movement-blocking face blocking the movement of the stake oriented perpendicularly to the direction of insertion of the stake in the opening and located opposite the wall of the backrest structure in which the opening is made, the movement-blocking face being capable of coming into contact with the wall of the backrest structure.

8. The backrest of claim 7, wherein:

the first stop comprises a shoulder which marks the limit between an intermediate portion of the shank and a thicker portion of the shank joining the head of the stake, and wherein the second stop marks the limit between said intermediate portion and the clipping end fitting of the shank.

9. The backrest of claim 8, wherein:

the length of the thicker portion of the shank is less than or equal to the thickness of the foam layer under compression.

10. The backrest of claim 6 wherein:

a hollow space is provided in the backrest structure downstream from the opening in the direction of insertion of the shank, the hollow space having a depth corresponding at least to a distance separating the first stop from an end of the end fitting.

* * * * *